United States Patent
Murata

(10) Patent No.: US 7,377,427 B2
(45) Date of Patent: May 27, 2008

(54) METHOD, APPARATUS AND POS SYSTEM FOR PROCESSING CREDIT CARD TRANSACTIONS ASSOCIATED WITH POS SALES

(75) Inventor: Sadao Murata, Matsumoto (JP)

(73) Assignee: Seiko Epson Corporation (JP)

( * ) Notice: Subject to any disclaimer, the term of this patent is extended or adjusted under 35 U.S.C. 154(b) by 475 days.

(21) Appl. No.: 11/050,565

(22) Filed: Feb. 2, 2005

(65) Prior Publication Data

US 2005/0242172 A1    Nov. 3, 2005

(30) Foreign Application Priority Data

Feb. 2, 2004    (JP) .............................. 2004-025417

(51) Int. Cl.
    *G06K 15/00*    (2006.01)
(52) U.S. Cl. ..................... 235/383; 235/380; 235/379; 705/16; 705/38; 705/39; 705/44
(58) Field of Classification Search ................ 235/379, 235/383; 705/16–18, 39, 44
    See application file for complete search history.

(56) References Cited

U.S. PATENT DOCUMENTS

| | | | |
|---|---|---|---|
| 5,410,642 A | 4/1995 | Hakamatsuka et al. | |
| 5,657,389 A | 8/1997 | Houvener | |
| 5,790,674 A | 8/1998 | Houvener et al. | |
| 5,832,464 A | 11/1998 | Houvener et al. | |
| 6,040,783 A | 3/2000 | Houvener et al. | |
| 6,070,141 A * | 5/2000 | Houvener et al. | 705/1 |
| 6,202,055 B1 | 3/2001 | Houvener et al. | |
| 6,397,194 B1 | 5/2002 | Houvener et al. | |
| 6,424,249 B1 | 7/2002 | Houvener | |
| 6,628,808 B1 | 9/2003 | Bach et al. | |
| 6,726,094 B1 * | 4/2004 | Rantze et al. | 235/379 |
| 2002/0138351 A1 | 9/2002 | Houvener et al. | |

FOREIGN PATENT DOCUMENTS

| | | |
|---|---|---|
| JP | 05-250548 | 9/1993 |
| JP | 05-258120 | 10/1993 |
| JP | 06-135187 | 5/1994 |
| JP | 07-239648 | 9/1995 |
| JP | 10-021354 | 1/1998 |
| JP | 11-509015 | 8/1999 |

(Continued)

OTHER PUBLICATIONS

U.S. Appl. No. 10/932,181, filed Sep. 1, 2004, Yamanaka et al.

*Primary Examiner*—Michael G. Lee
*Assistant Examiner*—Kristy A. Haupt
(74) *Attorney, Agent, or Firm*—Anderson Kill & Olick, PC

(57) ABSTRACT

A method apparatus and POS system for processing credit card transactions associated with POS sales to inhibit illegal credit card use. The method involves reading magnetic stripe information including the credit card number from the magnetic stripe on a credit card and comparing the result with stored credit card transaction history of the credit card user to determine whether to scan and image further personal identification from the credit card user such as a drivers license and if so to image the driver license. This is primarily based on a comparison of the transaction amount with stored transaction history information.

10 Claims, 9 Drawing Sheets

FOREIGN PATENT DOCUMENTS

| | | |
|---|---|---|
| JP | 2000-247070 | 9/2000 |
| JP | 2000-259899 | 9/2000 |
| JP | 2000-322633 | 11/2000 |
| JP | 2001-101484 | 4/2001 |
| JP | 2001-297064 | 10/2001 |
| JP | 2002-352166 | 12/2002 |
| JP | 2003-256787 | 9/2003 |

* cited by examiner

[Condition (A): evaluation based on reading result]

METHOD, APPARATUS AND POS SYSTEM FOR PROCESSING CREDIT CARD TRANSACTIONS ASSOCIATED WITH POS SALES

BACKGROUND OF THE INVENTION

1. Field of Technology

This application relates in subject matter to U.S. patent application Ser. No. 10/932,181 filed by applicant on Sep. 1, 2004, the disclosure of which is incorporated herein by reference.

The present invention relates to a method, apparatus and POS system for processing credit card transactions associated with POS sales using a credit card to inhibit illegal credit card use.

2. Description of Related Art

Illegal credit card use due to theft and forgery has become a major problem. One method of preventing such illegal use at the point of sale in a retail store, for example, requires the credit card user to present a driver license or other photo ID. The checkout clerk then visually confirms (1) that the names match and (2) that the credit card user is the person shown on the photo ID. Problems with this method are that illegal users cannot be identified if the driver license was also forged, and no evidence that the driver license was forged remains.

Some businesses also have the clerk enter the driver license number from the keyboard of the POS terminal for evidence in case the credit card was abused, but data entry errors occur and the value of the entered driver license number as evidence is therefore low relative to the data entry work involved.

Considering this problem, Image Data LLC in the United States offers a personal identification system for confirming a person's identity based on a credit card presented by a user by referencing a database of personal identification information containing the credit card information and user photographs. See Japanese Published Patent Application H11-509015 (FIG. 1).

The problem with this system is that a common nationwide database of personal information about an unknown number of people does not exist, and the infrastructure enabling on-line verification of a person's identity also does not exist. This system therefore offers little practical benefit at this time.

SUMMARY OF THE INVENTION

The method according to the present invention for processing credit card transactions based on product information entered by an operator into a POS terminal computer or register comprises imaging personal identification presented by the credit card user when the transaction process meets a specific condition, such as when the calculated transaction amount exceeds a predetermined reference amount. The method includes an image scanning determination step for determining whether to image the personal identification based on the evaluation result of the transaction amount evaluation step if image scanning is determined necessary.

The credit card processing apparatus of the present invention for processing credit card transactions associated with POS sales using a POS terminal computer or register comprises: a transaction amount calculation means for calculating a credit card transaction amount based on the input product information to the POS terminal computer or register; a transaction amount evaluation means for determining if the transaction amount exceeds a predetermined reference amount; an image scanning determination means for determining whether to image personal identification of the credit card user based on the evaluation result of the transaction amount evaluation means; and an image scanning means for imaging such personal identification if image scanning the personal identification is determined necessary.

By thus imaging personal identification presented by a credit card user and saving information extracted from the personal identification, the saved information can be used for criminal evidence if the credit card is used illegally (such as using a forged credit card), and criminals fearing identification can be deterred from credit card fraud. Furthermore, these records of potential criminal evidence can be efficiently created without lowering job efficiency because personal identification is scanned when the result of reading the magnetic stripe information meets specific conditions, rather than for all users.

A preferred embodiment of the invention also includes the step of storing image data captured from the scanned personal identification, and the step of stopping the transaction process if the personal identification is not scanned.

The image scanning determination step preferably determines that image scanning the personal identification is necessary when the magnetic stripe information is not correctly read.

A criminal evidence record can thus be saved by imaging the personal identification when the magnetic stripe information cannot be normally read, that is, when the risk of a forged credit card is high. Because card information usually cannot be extracted from the magnetic stripe information in such cases, the card information is usually acquired from an impression of the credit card made with an imprinter (a machine for acquiring the card information by manually copying the embossed information), and this manually acquired card information is used for a credit card check.

The face of the credit card (the side with the raised characters) could be copied on a photocopier and the copy faxed to the credit card company for authorization. Using the present invention to save information from personal identification can more effectively prevent illegal credit card use even when it is necessary to rely on such a low security credit card check.

The image scanning determination step preferably determines whether to image scan the personal identification based on the presence or absence of an image scanning command from the operator, rather than based on the result of reading the magnetic stripe information.

In addition, the image scanning determination means preferably determines whether to image scan the personal identification based on the presence or absence of an image scanning command from the operator, rather than based on the result of reading the magnetic stripe information.

A record of criminal evidence can thus be created by image scanning the personal identification based on whether the operator issues an image scanning command. For example, the potential for credit card forgery is considered particularly high with corporate credit cards. As a result, the operator can visually inspect each credit card and issue the image scanning command to image the customer's personal identification when a corporate credit card is presented. The operator could also consider other factors such as local conditions or customer behavior, for example, and issue the image scanning command when the operator determines that the risk of credit card fraud is high, thereby efficiently preventing illegal credit card use. The image scanning command could be asserted by operating a specific key or by inserting the personal identification to the image scanner. Imaging could also be executed unless the operator performs a specific action.

The method preferably includes a calculation step for calculating the credit card transaction amount based on the input product information to a POS terminal computer or register, and a transaction amount evaluation step for determining if the transaction amount exceeds a predetermined reference amount. The image scanning determination step preferably determines whether to image the personal identification based on the result of the transaction amount evaluation step, rather than based on the result of reading the magnetic stripe information.

Yet further preferably, this credit card processing control apparatus also has a transaction amount calculation means for calculating the credit card transaction amount based on the input product information, and a transaction amount evaluation means for determining if the transaction amount exceeds a predetermined reference amount. The image scanning determination means preferably determines whether to image the personal identification based on the result of the transaction amount evaluation step, rather than based on the result of reading the magnetic stripe information.

This arrangement creates a record of criminal evidence when the transaction amount exceeds a specified threshold value, that is, when the risk of illegal credit card use is high. Store risk can thus be effectively reduced, and illegal use can be efficiently prevented.

The credit card processing control method also preferably has a reference amount selection step for setting the reference amount used to evaluate the transaction amount.

The reference amount can thus be set with consideration for store risk and the desired job efficiency. Note that setting a high reference amount improves efficiency but also increases the risk of illegal use.

The method preferably includes storing historical information about past transaction processes and information about the credit card user and comparing information extracted from the magnetic stripe on the credit card with the stored historical information. The image scanning determination step determines whether to image the personal identification based on presence or absence of historical transaction information for the credit card user rather than based on the evaluation result of the transaction amount evaluation step.

The apparatus also preferably has a transaction history storage means for storing historical information about past transaction processes, including information about the credit card user extracted from the magnetic stripe information. The image scanning determination means then determines whether to image the personal identification based on presence or absence of historical transaction information for the credit card user rather than based on the evaluation result of the transaction amount evaluation means.

This arrangement creates a criminal evidence record by scanning the personal identification based on whether there is a history of past credit card use. In other words, presenting personal identification is always required the first time a customer uses a credit card in a particular store. Criminals that fear being identified are thus deterred from using a forged credit card because presenting personal identification is always required the first time a credit card is used. Rather than imaging personal identification based on whether a past transaction history exists, customers that have not used a credit card for a specific period of time could be required to present identification. Because some types of identification are regularly updated (such as passports), this arrangement keeps an image of the most recent personal identification, and thus creates a record of highly reliable evidence.

In another embodiment of the method of the present invention a transaction amount calculation step is conducted for calculating the credit card transaction amount based on the input product information to a POS terminal computer or register; a transaction history storage step for storing historical information about past transaction processes, including information about the credit card user extracted from the magnetic stripe information and transaction amount information; and a transaction amount/transaction history evaluation step for referencing the transaction history information and determining if the current transaction amount for the credit card user is greater than the previous highest transaction amount for the same credit card user; wherein the image scanning determination step determines whether to image the personal identification based on the evaluation result of the transaction amount/transaction history evaluation step rather than based on the evaluation result of the transaction amount evaluation step.

This arrangement creates a record of criminal evidence by imaging personal identification when the amount of the current transaction is greater than the previous highest transaction amount. When a credit card that is normally used only for small purchases, such as buying household goods and food in the grocery store or department store, is presented to pay for expensive purchases of jewelry or large appliances, for example, that is, when the likelihood of credit card theft and illegal use is high, a record of criminal evidence can be created by thus requiring and scanning personal identification.

Whether imaging personal identification is required could also be based on whether the current transaction amount exceeds the average of all past transaction amounts, or if the current transaction amount exceeds the previous highest transaction amount by a specified multiple or other factor, rather than whether the current transaction amount exceeds the previous highest transaction amount.

Further preferably, the transaction history storage step stores credit card proof-of-transaction data, including at least the transaction number of the transaction process and the credit card number extracted from the magnetic stripe information, for each transaction process in addition to the user-related information. The credit card processing control method also has a query step for searching credit card proof-of-transaction data containing transaction numbers, user names, and card numbers when a specific transaction number, user name, or credit card number is specified.

By thus storing information relating to each transaction process as credit card proof-of-transaction data, and enabling searching the credit card proof-of-transaction data based on any data stored in the database, the needed data can be quickly found and retrieved when illegal credit card use is discovered or a customer inquiry is received.

The method further preferably includes a personal identification information extraction step for extracting personal identification information of the credit card user including the identification number recorded on the personal identification by OCR processing an image of the personal identification. The transaction history storage step also stores the personal identification information with the credit card proof-of-transaction data when personal identification is imaged; and the query step can search credit card proof-of-transaction data containing transaction numbers, user names, card numbers, and identification numbers when a specific transaction number, user name, credit card number, or identification number is specified.

By thus storing personal identification information including the identification number of the personal identification as the credit card proof-of-transaction data, a record containing reliable evidence can be saved, and the credit card proof-of-transaction data can also be searched based on the identification number. The required storage capacity can also be reduced by storing only the OCR result rather than storing the raw image data of the personal identification.

The apparatus and method further preferably includes printing means for printing credit card proof-of-transaction data found in the query or comparison step using a printing means for printing the transaction process result on a receipt.

The receipt printer can thus be used to print the credit card proof-of-transaction data, and proof of a transaction can be quickly provided when requested by a customer.

Yet further preferably, this credit card processing control method also has a notification step for reporting the result of the image scanning determination step.

The operator can thus determine whether to scan personal identification (whether to ask the customer for personal identification) by reading the result reported by the notification step. A request to present personal identification could also be displayed on the customer display rather than or in addition to a message displayed on the operator display.

A yet further aspect of the present invention is a POS system having a credit card processing apparatus as described above, and a POS server for centrally controlling the credit card processing apparatus via a network connection to the credit card processing apparatus.

By imaging personal identification presented by a person using a credit card, only when the transaction process meets certain conditions (such as when the possibility of illegal use is high), and not for all credit card users does not lower job efficiency.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The present invention is hereafter described with reference to a POS terminal or a hybrid processing apparatus used as a POS terminal in a restaurant, retail store, or other business. Note that a hybrid processing apparatus as used herein is a single device providing the functions of multiple devices, such as an image scanner for imaging personal identification and credit cards, a credit card authorization terminal with a magnetic stripe reader for reading magnetically encoded data from a credit card, a check processing system for check imaging, magnetic ink character reading, and check printing, and a receipt printer.

Figure 1:
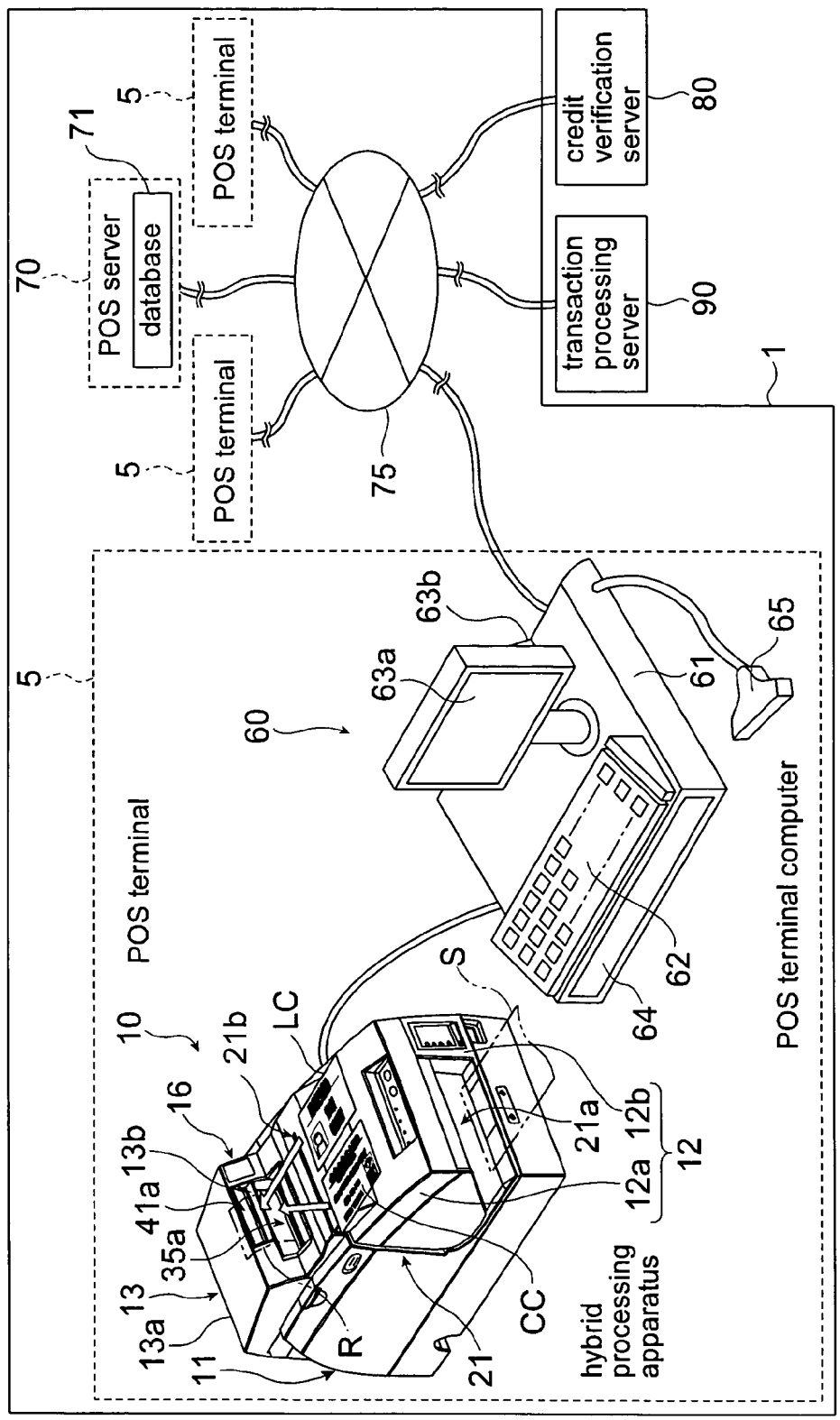
FIG. 1 is a schematic diagram of a POS system according to a preferred embodiment of the present invention.
Figure 2:
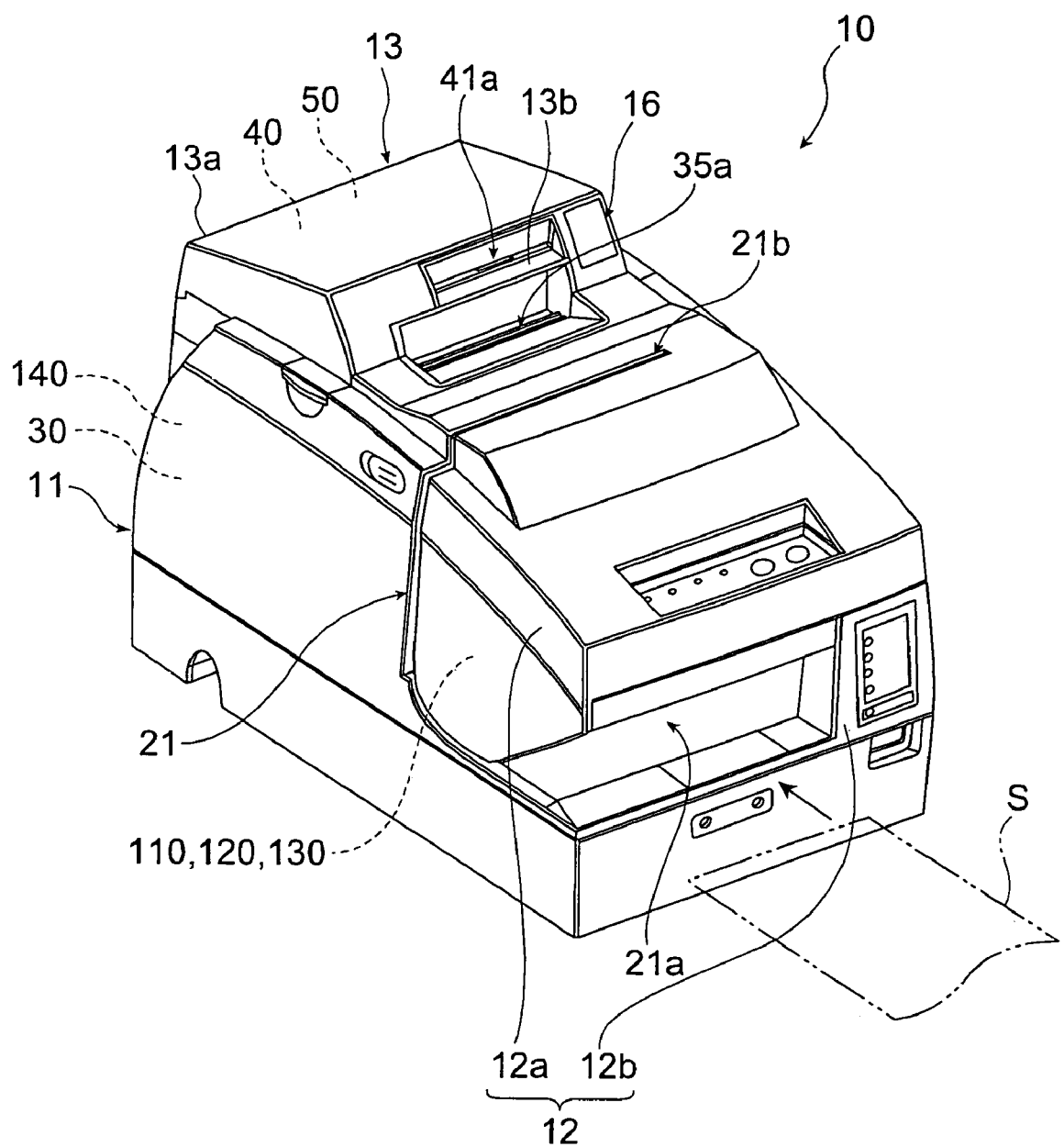
FIG. 2 is an oblique overview of a hybrid processing apparatus having the function of a credit card processing apparatus according to a preferred embodiment of the present invention.

As shown in FIG. 1 and FIG. 2, a POS terminal 5 according to the present invention has a POS terminal computer 60 and a hybrid processing apparatus 10. An operator enters product codes to the POS terminal computer 60, and the POS terminal computer 60 calculates the transaction amount. The hybrid processing apparatus 10 handles such tasks as imaging personal identification and various printing operations related to credit cards CC, checks (slips) S, and receipts R. A driver license LC is used below as an example of personal identification.

The POS terminal computer 60 has a main case 61, keyboard 62 for data entry by the operator, a barcode reader 65 for entering product codes by reading the barcode affixed or printed on the product, display screens 63 (such as an operator display 63a and customer display 63b) for displaying price information for the products corresponding to the input product codes and messages such as whether scanning the customer's driver license LC is required, and a cash drawer 64 for holding cash and other payment vehicles. The POS terminal computer 60 is connected to a POS server 70 over a network 75.

The POS server 70 is connected to a plurality of POS terminals 5 (three in this example), and centrally processes product information input to the POS terminal 5 and inventory data. More specifically, the POS server 70 receives the product information input to the POS terminal computer 60, and based on this information retrieves product name, price, and other information from a price list (PLU list) stored in a database 71. Using the retrieved information, the POS server 70 then generates product data for printing to a receipt and presenting on the display screen 63 as further described below, and sends this product data to the POS terminal computer 60.

The POS terminal computer 60 then generates a unique transaction number for tracking each transaction process (all financial processes, not only purchasing transactions), and based on the product data sent from the POS server 70 generates print data (including the transaction number) for printing to a receipt R and display data for presentation on the display screen 63. The POS terminal computer 60 then sends the print data to the hybrid processing apparatus 10 together with a print receipt R command.

The POS terminal computer 60 is connected over the network 75 (such as the Internet) to a credit verification server 80 for authorizing charges to a credit card CC, and a transaction processing server 90 for verifying whether a check S is valid.

The credit verification server 80 is maintained by a credit card company or clearing house (an organization run by multiple credit card companies for running credit checks and credit card authorizations). Based on the card information (the credit card number, cardholder's name, and expiration date read by the magnetic head 58) read from a credit card CC by the hybrid processing apparatus 10, the credit verification server 80 runs a credit card check to determine if the card has been reported as lost or stolen, and returns the result to the POS terminal computer 60.

Based on the information read by the hybrid processing apparatus 10 from the MICR code on the check S, the transaction processing server 90 determines if a check S is valid and returns the result to the POS terminal computer 60.

A hybrid processing apparatus 10 is connected to the POS terminal computer 60 through a connector not shown, and is a single unit arranged to provide such functions as image scanning a credit card or driver license LC; reading information from the magnetic stripe on a credit card; and imaging, printing, and reading MICR text from checks S. A POS terminal 5 that can process credit cards and checks S in a single, continuous process can thus be provided by simply connecting this hybrid processing apparatus 10 to a POS terminal computer 60.

As shown in FIG. 2, the hybrid processing apparatus 10 has a back housing 11, a front housing 12, and a top cover unit 13. The back housing 11 has a receipt paper compartment 30 for holding a roll of receipt R paper, and houses the receipt printing unit 140 for printing receipts R. The front housing 12 is disposed in front of the back housing 11 and forms a check transportation path 21 between the front housing 12 and back housing 11. The top cover unit 13 covers the top side of the back housing 11, and houses the credit card/driver license image scanner 40 and magnetic stripe reader 50. The credit card/driver license image scanner 40 images the front of a credit card or driver license LC. The magnetic stripe reader 50 reads the magnetic stripe on a credit card, for example.

The front housing 12 includes a top cover 12a that is disposed opposite the back housing 11 with the check transportation path 21 therebetween, and a front side unit 12b that supports the top cover 12a in a cantilevered manner. Checks S are inserted from a check insertion opening 21a below the top cover 12a.

Disposed to the check transportation path 21 between the check insertion opening 21a from which checks S are inserted and the slip exit 21b from which checks S and other slips are discharged are a magnetic ink character reader (MICR) 110 for reading the MICR code preprinted in magnetic ink on the checks S, a check image scanner 120 for imaging the front and back sides of a check S, a check printing unit 130 for printing the transaction amount, store information, and other data to the checks S, and a plurality of transaction rollers whereby the checks S are conveyed for processing by these other functions.

Figure 3:
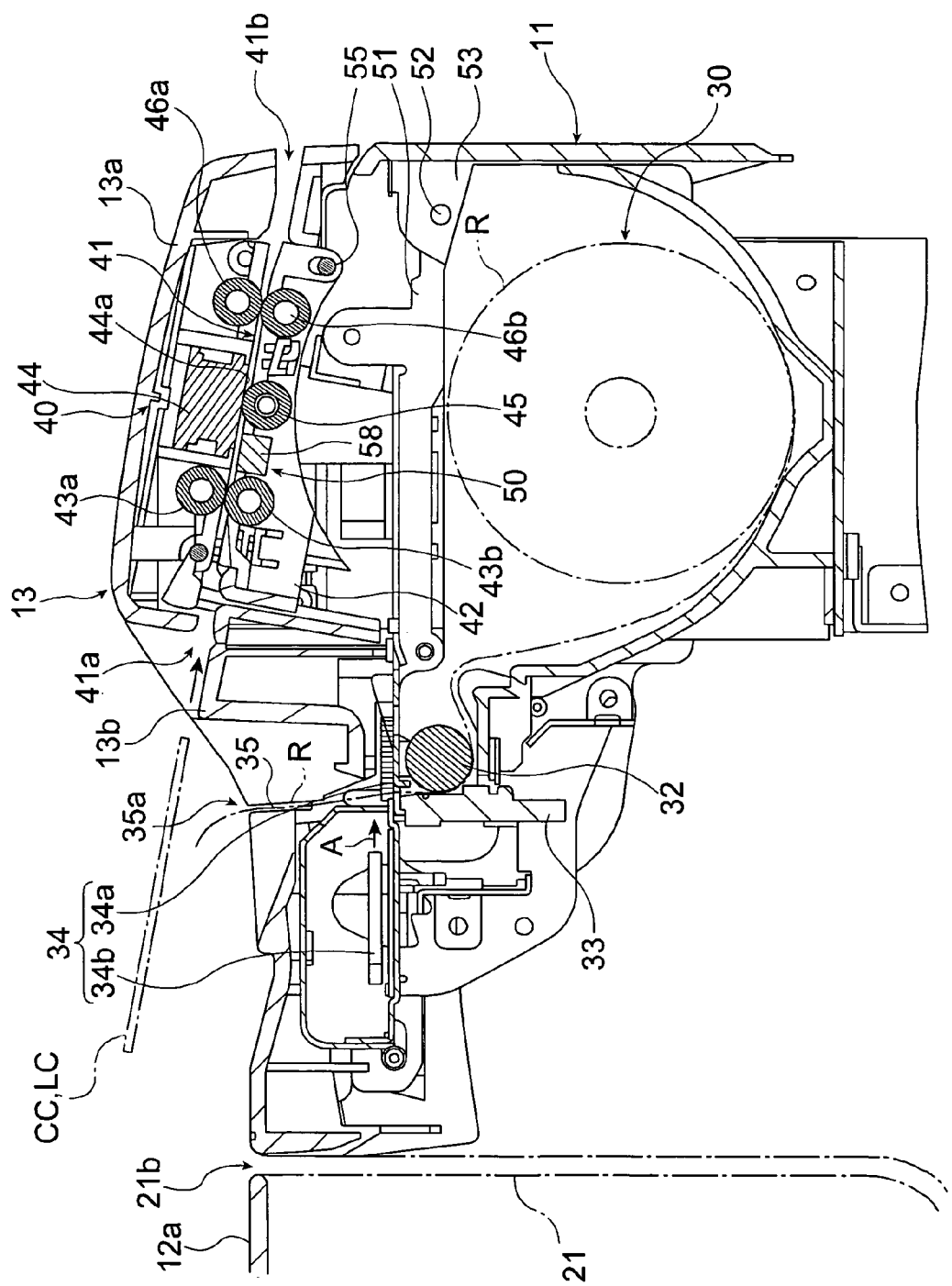
FIG. 3 is a partial section view of the hybrid processing apparatus.

A plurality of transportation rollers 43, 45, 46 (see FIG. 3) is disposed to the top cover unit 13 in addition to the credit card/driver license image scanner 40 for reading credit cards and driver licenses LC and the magnetic stripe reader (MSR) 50 for reading the magnetic stripe on a credit card, for example. Credit cards CC and driver licenses LC are conveyed by these transportation rollers 43, 45, 46 as the credit card CC or driver license LC is processed. These transportation rollers 43, 45, 46 can convey the medium in both forward and reverse directions, i.e., the rollers can drive in both forward and reverse rotation, and the credit card/driver license image scanner 40 operates while the medium is conveyed in the reverse direction, that is, to the left as seen in FIG. 3). The operations whereby a credit card or driver license LC is imaged, and the magnetic stripe on a credit card is read, are described in detail below.

The components around the receipt transportation path 35 are described next with reference to FIG. 3. Receipt paper R is wound in a roll that is housed in the receipt paper compartment 30. Receipt paper R is pulled off the roll in the receipt paper compartment 30, conveyed through the receipt transportation path 35 formed between the back housing 11 and top cover unit 13, and discharged from the receipt exit 35a.

A thermal print head 33 and a platen roller 32 for pressing the print medium to the thermal print head 33 are disposed on opposite sides of the receipt transportation path 35 so that a receipt R is printed by the thermal print head 33 as the receipt paper is conveyed by the platen roller 32. The printed receipt R is cut to an appropriate length by an automatic paper cutter 34 disposed above (downstream from) the thermal print head 33 and platen roller 32, and is then discharged from the receipt exit 35a.

The automatic paper cutter 34 has a fixed blade 34a disposed on one side of the receipt transportation path 35 and a movable blade 34b disposed on the opposite side of the receipt transportation path 35 at a position appropriately corresponding to the fixed blade 34a. The movable blade 34b moves in the direction of arrow A in FIG. 3 across the receipt transportation path 35, thereby cutting the receipt R held between the movable blade 34b and fixed blade 34a.

The main frame 51 disposed below the top cover unit 13 is attached pivotably on a hinge unit 52 to a stationary portion 53 of the back housing 11. The top cover unit 13 can thus swing open and closed to the receipt paper compartment 30. To replace the receipt R paper, the top cover unit 13 is thus swung up and open, and the receipt R paper roll is loaded into the receipt paper compartment 30.

Figure 4:
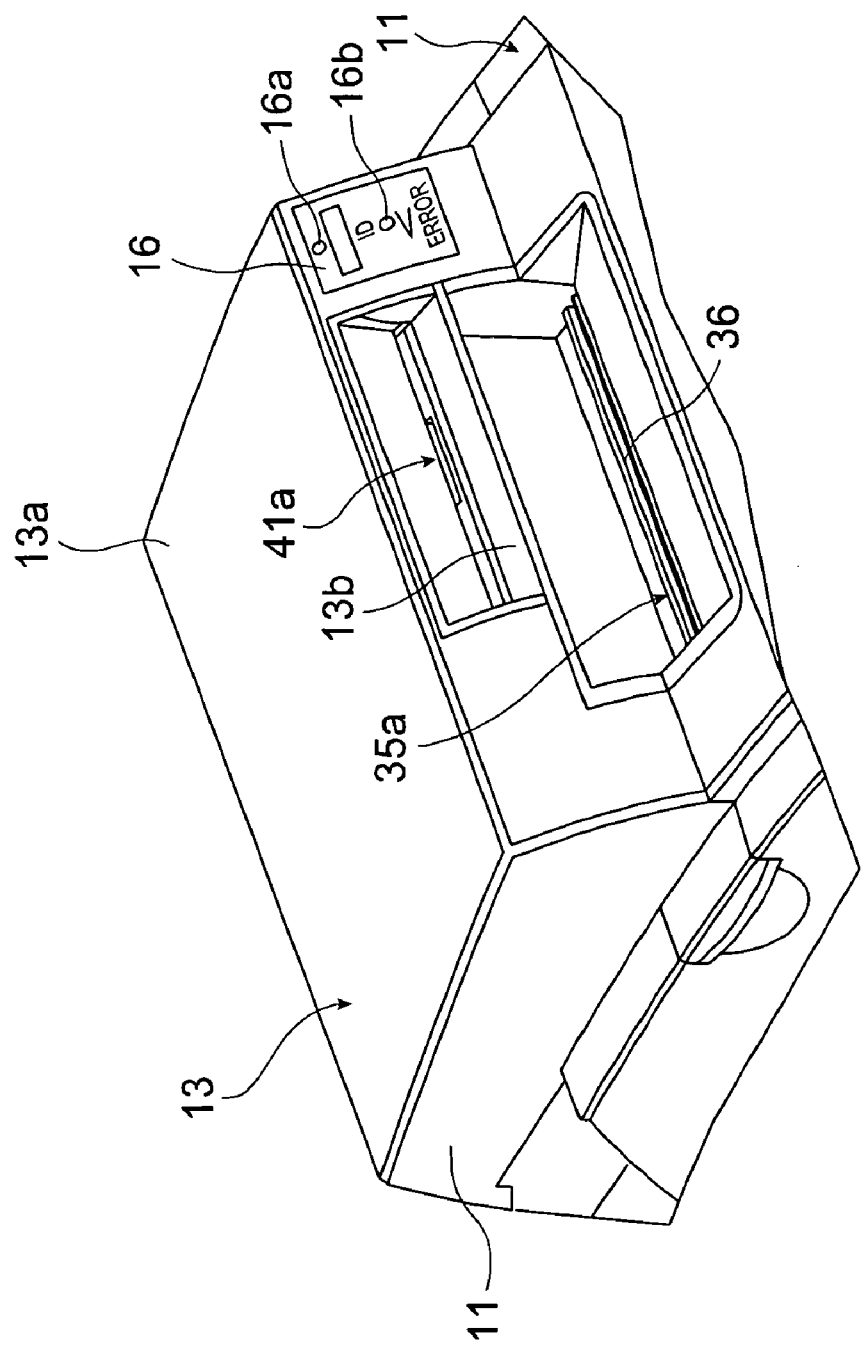
FIG. 4 is an oblique view of the top cover unit of the hybrid processing apparatus.

The parts around the credit card/driver license image scanner 40 and magnetic stripe reader 50 are described next with reference to FIG. 3, FIG. 4, and FIG. 5. As shown in FIG. 3, the credit card/driver license image scanner 40 and magnetic stripe reader 50 are disposed between the top cover 13a and the receipt paper compartment 30, and scan the inserted card or read the magnetic stripe when the POS terminal 5 operator inserts a credit card or driver license LC from the card insertion opening 41a.

Figure 6:
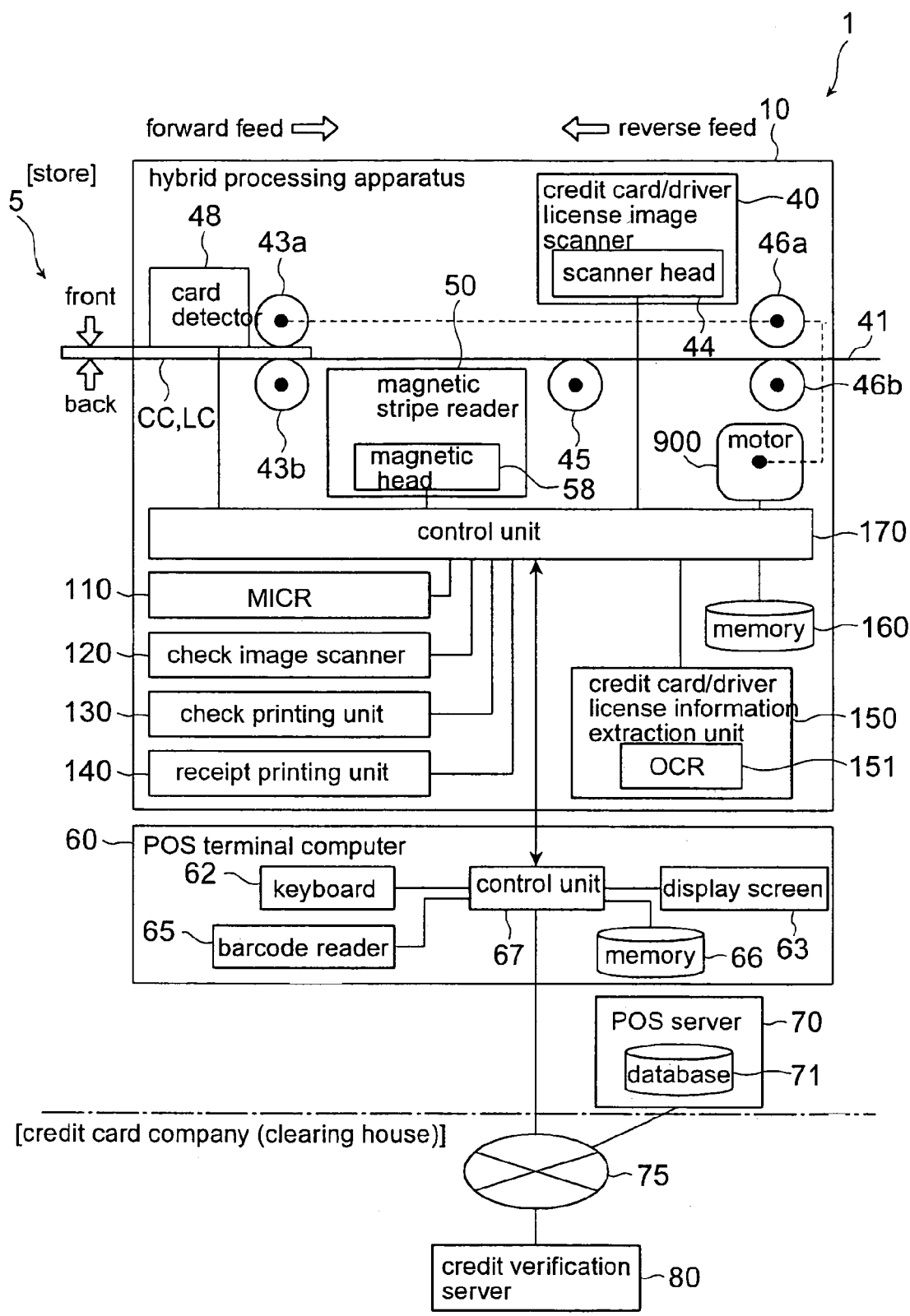
FIG. 6 is a control block diagram of a POS terminal according to a preferred embodiment of the present invention.

Processing a credit card starts with the magnetic stripe reader 50 reading the information recorded in the magnetic stripe (see FIG. 6). If the magnetic stripe is read successfully, a credit card check is run based on the read information. If reading the magnetic stripe fails, the credit card/driver license image scanner 40 captures an image of the credit card (see FIG. 6). The captured image is OCR-processed by the credit card/driver license information extraction unit 150 (see FIG. 6), and the card information extracted by the OCR process is then used for a credit card check. The driver license LC is processed (imaged) if specific conditions are met (such as when reading the magnetic stripe on the credit card fails) so that the driver license LC information can be saved as evidence if the credit card is used illegally. The specific conditions triggering driver license LC processing are described further below.

When a driver license LC is processed, reading the magnetic stripe information can be omitted with only image scanning and OCR processing used, but because the transportation control used for image scanning is the same for both driver licenses LC and credit cards CC, processing a credit card CC is described below by way of example.

As shown in FIG. 3, a table 13b for guiding credit card CC insertion is formed in front of the card insertion opening 41a. The operator inserts a credit card CC along this table 13b. An LED unit 16 for displaying information relating to the credit card CC image scanning and magnetic stripe reading operations is provided on the top cover 13a adjacent to the card insertion opening 41a.

The LED unit 16 has a card status LED 16a that lights according to the status of the credit card CC, and a transportation status LED 16b that lights according to the transportation status of the credit card CC. The card status LED 16a more specifically lights according to the result of credit card CC insertion and discharge detection, and the status of imaging the front of the credit card CC and reading the magnetic stripe. The transportation status LED 16b lights when a credit card CC transportation error occurs.

The main component of the credit card/driver license image scanner 40 and magnetic stripe reader 50 is the scanner head 44 and magnetic head 58, respectively. The magnetic head 58 and then the scanner head 44 are disposed in sequence from the card insertion opening 41a along the card transportation path 41. The magnetic stripe information is read as the credit card CC is transported in the forward direction by the transportation rollers 43, 45, 46 after being inserted. If the magnetic stripe cannot be read normally, the card is conveyed forward to a specific position and is then reversed by the transportation rollers 43, 45, 46 for image scanning.

The transportation rollers 43, 45, 46 include first feed roller 43a and second feed roller 46a that are disposed on the top side of the card transportation path 41 and are driven by a motor 900, and a first pressure roller 43b, pressure roller 45, and second pressure roller 46b disposed on the bottom side of the card transportation path 41. After the credit card CC is conveyed passed the magnetic head 58 by the first feed roller 43a and first pressure roller 43b, the credit card is conveyed between the scanner head 44 and pressure roller 45. The second feed roller 46a and second pressure roller 46b are disposed downstream from the scanner head 44.

The magnetic head 58 is for reading information prerecorded to the magnetic stripe on the back (bottom as seen in FIG. 3) of the credit card, and is therefore disposed at a position corresponding to the magnetic stripe on the credit card CC. A magnetic head 58 could also be disposed on the top side of the card transportation path 41 for reading magnetically encoded data from credit cards CC produced to different standards. The magnetic stripe information read by the magnetic head 58 is then sent to the credit verification server 80 operated by the credit card company to a credit card check.

The scanner head 44 is pressed to the imaging surface 44a of the scanner head 44 by the pressure roller 45 with force appropriate to the card thickness, and illuminates the top (front) surface of the credit card conveyed through the card transportation path 41, senses the light reflected from the credit card CC at the 44a, and thus reads an image of the text, images, and embossed part on the front of the credit card CC. A plurality of photoelectric conversion elements not shown is arrayed in a row longitudinally to the imaging surface 44a, that is, perpendicularly to the direction of card transportation, and each photoelectric conversion element generates an electric signal according to the detected luminance level.

Image data captured by the scanner head 44 from a credit card CC or driver license LC is OCR-processed by the OCR 151, and the card number, cardholder name, and other card information is extracted from the embossed part of a credit card CC. License information such as the driver license number and driver name is extracted from the data in the text area of a driver license LC. The OCR result (that is, the card information and license information) is then sent with the unique transaction number set for each transaction process and the transaction content (transaction amount, for example) for storage in the database 71 of the POS server 70. The information can then be retrieved later for criminal evidence if needed.

This embodiment of the invention is described using by way of example a credit card CC having embossed information and a driver license LC having a driver license number and other text information recorded on the surface. The location and number of the scanner heads 44 may vary, however, if credit cards CC that are embossed on the back or on both sides are processed, or if imaging personal identification other than driver licenses is desirable.

The first pressure roller 43b, pressure roller 45, and second pressure roller 46b are rotatably supported on the internal cover 42 between the card transportation path 41 and receipt paper compartment 30. The internal cover 42 is pivotably attached by means of hinge unit 55 to guide walls 54 (see FIG. 5). These guide walls 54 stand substantially perpendicularly to the card transportation direction from the top cover unit 13. The hinge unit 55 is disposed at the back side of the internal cover 42. When the top cover unit 13 opens, the front side of the internal cover 42, which faces upward, is pulled toward the front of the hybrid processing apparatus 10, thus enabling maintenance of the parts along the card transportation path 41 from the front of the hybrid processing apparatus 10.

Figure 5:
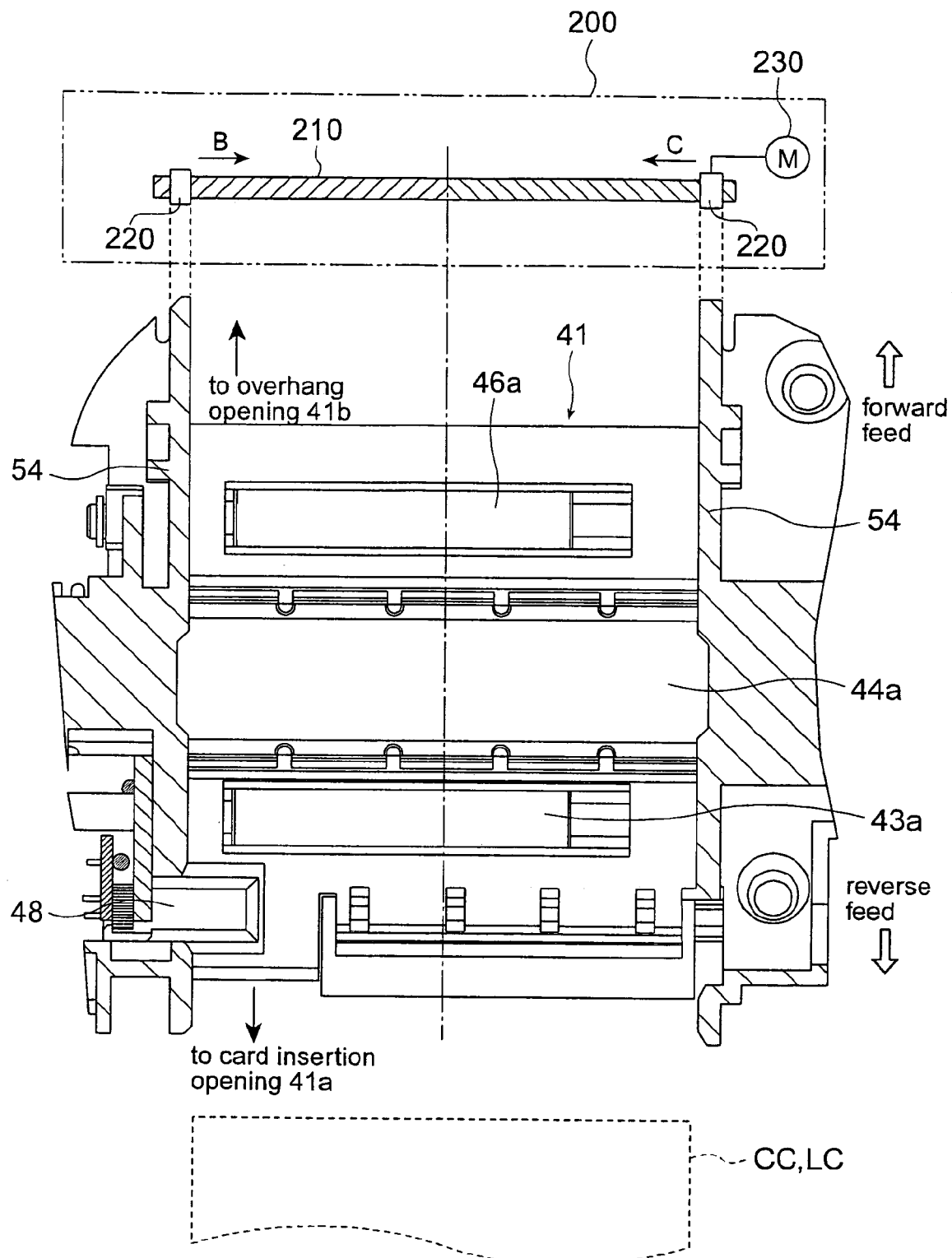
FIG. 5 is a section view showing the top side of the card transportation path in the hybrid processing apparatus.

As shown in FIG. 5, the guide walls 54 affixed to the internal cover 42 guide the insertion direction of a credit card CC inserted to the card transportation path 41. If the credit card is inserted slightly biased to the card transportation direction, for example, the credit card CC will contact and be guided by one of the guide walls 54 as the card is conveyed by the first feed roller 43a and second feed roller 46a. The guide walls 54 thus correct the direction of credit card CC travel so that the direction of credit card CC travel is aligned with the normal direction of travel. As a result, even if a credit card is inserted at a slight angle to the normal direction of card transportation, the direction of travel is guided and corrected by the guide walls 54 as the credit card CC is conveyed.

The transportation direction is corrected while the first feed roller 43a and second feed roller 46a convey the card from the card insertion opening 41a forward to the overhang opening 41b, and correction is completed when the credit card CC has completely passed the scanner head 44. After the credit card CC completely passes the scanner head 44, the credit card CC is reversed and imaged as the card passes back over the imaging surface 44a of the scanner head 44. The scanner head 44 thus always images the front of the credit card CC with the credit card thus correctly aligned.

As shown in FIG. 5, a card detector 48 is disposed near the card insertion opening 41a of the card transportation path 41. This card detector 48 detects if a credit card CC is inserted, and driving the first feed roller 43a and second feed roller 46a starts based on the output from the card detector 48. That is, inserting a credit card CC triggers starting the card transportation operation of the card transportation path 41.

Operation when processing credit cards CC and driver licenses LC of different height (the horizontal width as seen in FIG. 5) is described next. As noted above, a credit card CC or driver license LC can be inserted from the card insertion opening 41a and the scanner head 44 can read and image both types of cards. However, when the hybrid processing apparatus 10 is used to process credit cards CC and driver licenses LC of different dimensions from different countries or states, the positions of the guide walls 54 must be adjusted to the width of the inserted card.

To accommodate processing credit cards CC and driver licenses LC of different height (width), the guide walls 54 are preferably movable in this width direction as indicated by the imaginary double-dot dash line 200 in FIG. 5. A lead screw 210 that is reverse threaded from the center point of the card transportation path 41 is disposed separated from the magnetic head 58 and scanner head 44, and female nuts 220 are threaded to both ends of the lead screw 210. The nuts 220 are rotationally driven by a motor 230. Depending on the direction in which the nuts 220 turn, both guide walls 54 move in the direction of arrows B and C to suitably guide the card when a narrow card is inserted. This simple mechanism thus enables reliably guiding and scanning cards of different height (width). A mechanism (not shown in the figure) for moving the magnetic head 58 synchronized to movement of the guide walls 54 is also preferably provided in this arrangement. The magnetic stripe can thus be reliably read even when the guide walls 54 have moved.

The control arrangement of the POS terminal 5 is described next with reference to FIG. 6. As described above, the POS terminal 5 is composed of a hybrid processing apparatus 10 and a POS terminal computer 60.

As shown in FIG. 6, the hybrid processing apparatus 10 has a card detector 48 for detecting insertion of a credit card or driver license LC; transportation rollers 43, 45, 46 disposed along the card transportation path 41, and a motor 900 for driving the first feed roller 43*a* and second feed roller 46*a* in the transportation roller set; a magnetic stripe reader 50 having a magnetic head 58 for reading information from the magnetic stripe on a credit card, for example; a credit card/driver license image scanner 40 having a scanner head 44 for capturing an image of the credit card CC or driver license LC; a magnetic line reader (MICR) 110 for reading the MICR code preprinted on the check S; a check image scanner 120 for imaging the front and back sides of checks S; a check printing unit 130 for printing transaction amount, store information, and other content on the front and back of the check S; a receipt printing unit 140 for printing the result of the transaction process on the receipt R; a credit card/driver license information extraction unit 150 having an OCR 151 for extracting credit card information and driver license information from the credit card CC or driver license LC read by the scanner head 44; memory 160 (RAM) for temporarily storing the magnetic stripe information read by the magnetic head 58, the image data captured by the scanner head 44, and the credit card or driver license information extracted by the OCR 151; and a control unit 170 for controlling the foregoing elements.

When a credit card CC or driver license LC imaging command is received from the foregoing POS terminal computer 60, the control unit 170 drives the feed rollers 43*a* and 46*a* by means of the transaction processing server 90 to start conveying the card CC, LC when the card detector 48 indicates that insertion of a credit card or driver license LC was detected.

If a credit card CC is inserted, forward rotation of the feed rollers 43*a* and 46*a* conveys the credit card CC to a position opposite the magnetic head 58, and the magnetic stripe information is read by the magnetic head 58. If the magnetic stripe information is not read normally, the credit card CC is conveyed to a position completely beyond (downstream of) the scanner head 44, and the feed rollers 43*a* and 46*a* are then reversed for imaging by the scanner head 44 as the credit card CC is conveyed in reverse.

If specific conditions indicating a stronger likelihood of illegal credit card use are satisfied, such as when the magnetic stripe information cannot be read normally, the control unit 170 determines that imaging the driver license LC is also necessary and therefore outputs a driver license imaging command. When the driver license LC is then inserted, the driver license LC is conveyed completely beyond the scanner head 44, the feed rollers 43*a* and 46*a* are then reversed, and the driver license LC is imaged while being conveyed in reverse passed the scanner head 44.

When the card CC, LC is conveyed over the scanner head 44 in the reverse direction as noted above, the control unit 170 manages imaging the front side of the card CC, LC. The captured image data is then OCR processed by the OCR 151 to extract the credit card information or driver license information. The information (the magnetic stripe information or credit card information, and the driver license information) captured by the magnetic head 58 and scanner head 44 is then sent to the POS terminal computer 60 after processing.

The POS terminal computer 60 has a barcode reader 65 for acquiring product codes, a keyboard 62 for data entry, a display screen 63 displaying image data sent from the hybrid processing apparatus 10 and instructions for the operator, memory 66 (RAM) for temporarily storing information received from the hybrid processing apparatus 10, and a control unit 67 for overall control of the POS terminal computer 60.

When a product code identifying a product purchased by a customer is input by the barcode reader 65, the control unit 67 accesses the POS server 70 to retrieve the name and price information corresponding to the product code from the product database, and generates display data for presentation on the display screen 63 and print data for printing a receipt R.

If a report indicating the result of magnetic stripe reading is received from the hybrid processing apparatus 10 and the magnetic stripe was read normally, the read result, that is, the magnetic stripe information, is temporarily stored in memory 66 and is sent to a credit verification server 80 operated by the credit card company or a clearing house for a credit card check. If the result of the credit card check is authorization to charge the credit card, that is, the transaction is approved, a credit card proof-of-transaction record containing the transaction content, such as the transaction number set at the beginning of the transaction, the magnetic stripe information captured from the credit card, and the transaction amount, is generated, and this credit card proof-of-transaction record is then sent to the POS server 70.

If the control unit 67 detects that reading was unsuccessful, the control unit 67 instructs the hybrid processing apparatus 10 to image the credit card. After the OCR result, that is, the card information, is returned, the control unit 67 runs a credit card check based on the OCR result data. The control unit 67 also generates a credit card proof-of-transaction record containing the transaction content, such as the transaction number set at the beginning of the transaction, the magnetic stripe information captured from the credit card, and the transaction amount.

When the transaction process satisfies specific conditions, the control unit 67 instructs the hybrid processing apparatus 10 to scan and image the driver license LC. When the result of this operation, that is, the driver license information acquired by OCR processing, is returned, the control unit 67 adds this driver license information, that is, the result of OCR processing the driver license LC, to the credit card proof-of-transaction record as additional proof of the credit card transaction.

When the POS server 70 receives a credit card proof-of-transaction record from the POS terminal computer 60, the POS server 70 writes the data to the database 71. The credit card proof-of-transaction record can thus be retrieved as evidence of a crime if the credit card is later determined to have been used illegally.

Figure 7:
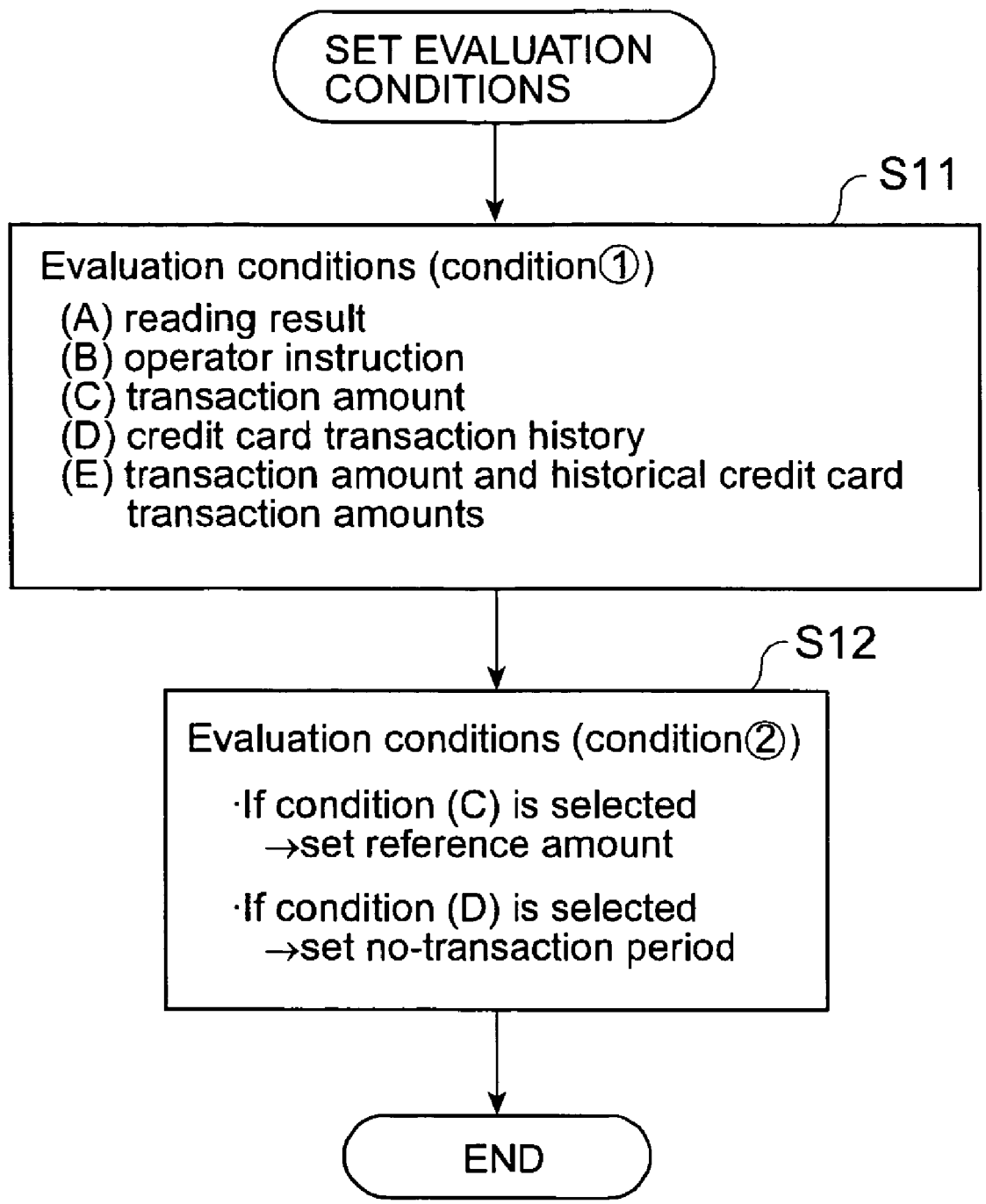
FIG. 7 is a flow chart of the process by the POS terminal computer for setting evaluation criteria.
Figure 8:
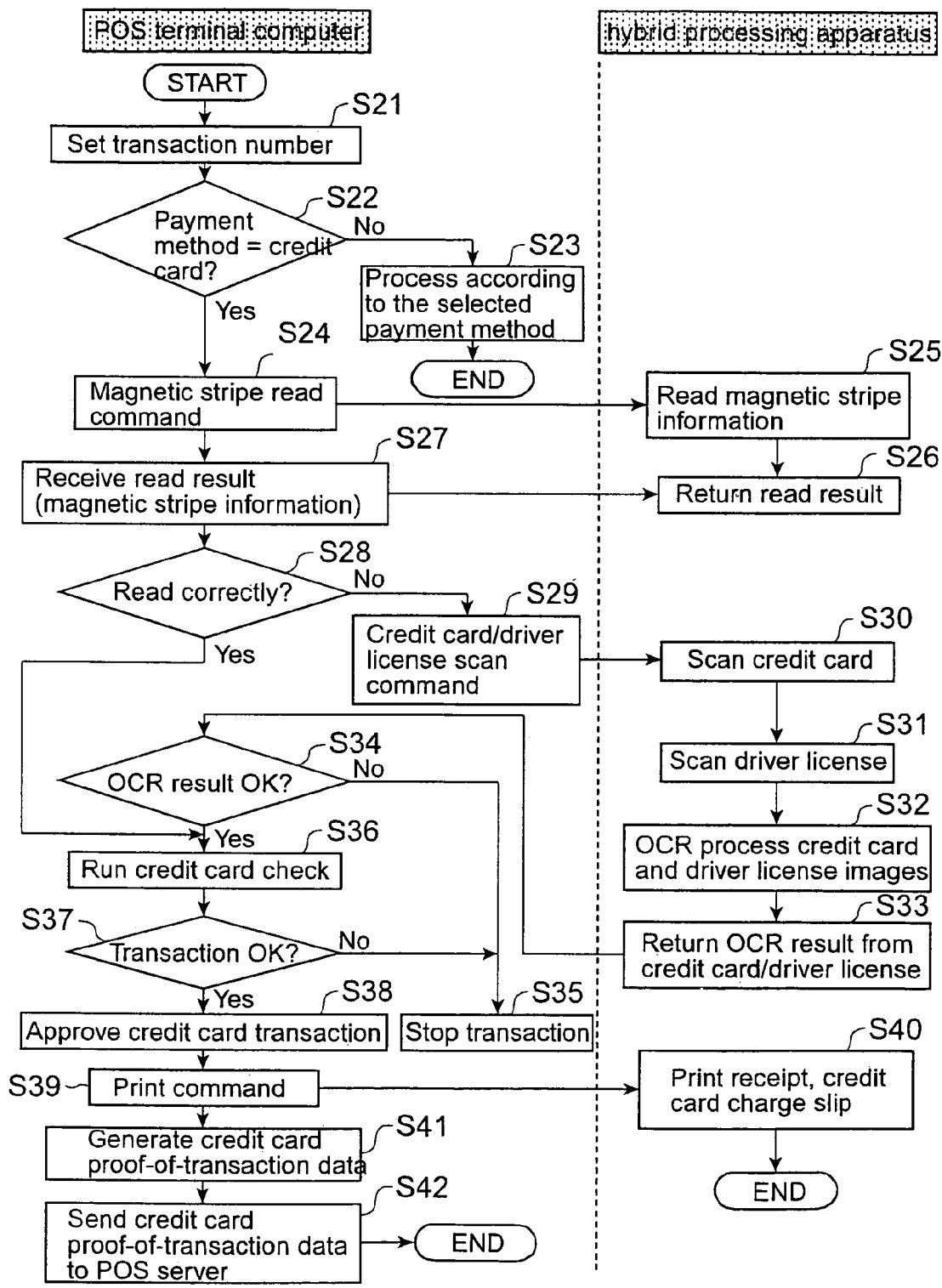
FIG. 8 is a flow chart of the credit card transaction process run by the POS terminal computer and hybrid processing apparatus.
Figure 9:
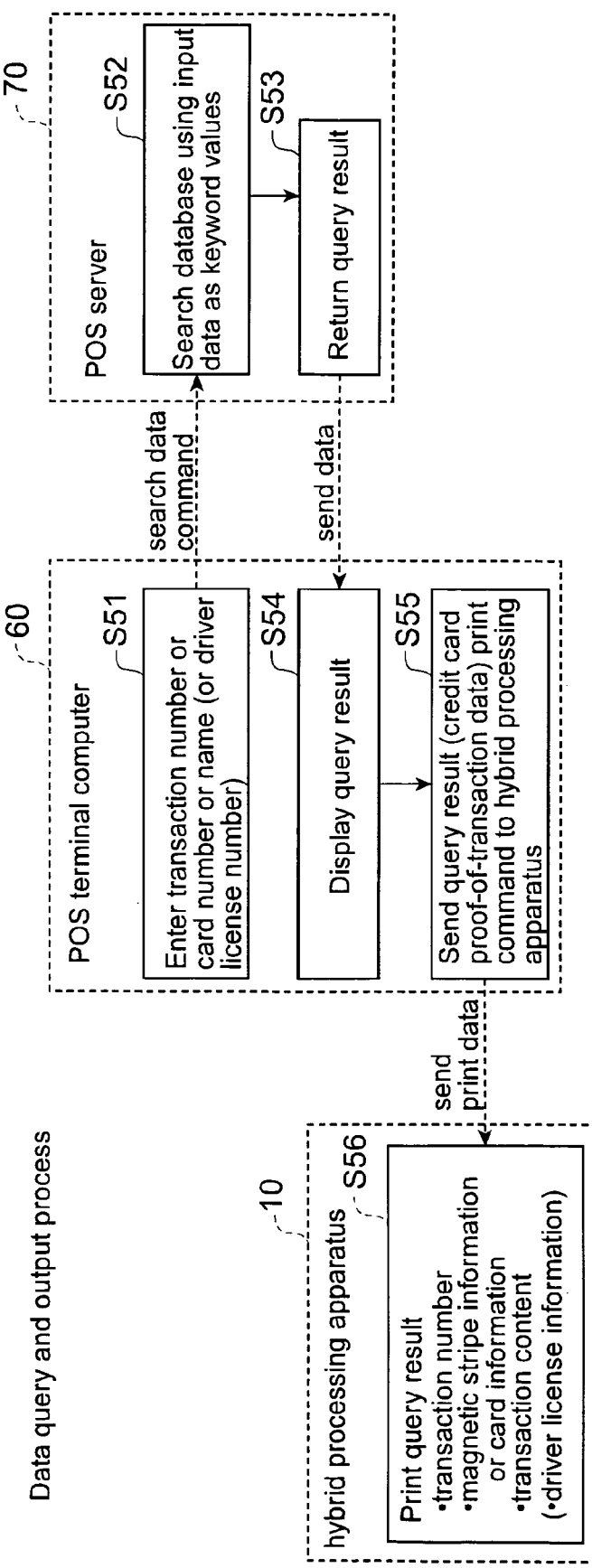
FIG. 9 is a flow chart of the data search and retrieval process run by the POS terminal computer, POS server, and hybrid processing apparatus.

The credit card processing control method of the present invention is described next with reference to the flow charts in FIG. 7 to FIG. 9. FIG. 7 is a flow chart of the process run by the POS terminal computer 60 for setting evaluation criteria, FIG. 8 is a flow chart of the credit card transaction process run by the POS terminal computer 60 and hybrid processing apparatus 10, and FIG. 9 is a flow chart of the data search and retrieval process run by the POS terminal computer 60, POS server 70, and hybrid processing apparatus 10.

As shown in FIG. 7, the condition (condition 1) used to determine whether imaging the driver license LC is necessary can be selected from the five conditions (A) to (E) in this implementation of the invention (S11). As shown in FIG. 7, condition (A) is the reading result, condition (B) is an operator instruction, condition (C) is the transaction amount, condition (D) is the credit card transaction history, and condition (E) is the transaction amount combined with any previous credit card transaction amounts. The operator can select the desired conditions using the keyboard 62 while referring to the operator display 63a of the POS terminal computer 60.

A plurality of these conditions (A) to (E) could also be used together by obtaining the logical AND (such as A*E, A*C, A*D, or A*E) or the logical OR (such as A+B, A+C, A+D, or A+E) of the selected conditions.

If condition (A), reading result, is selected, whether the magnetic stripe information was read correctly by the magnetic head 58 is determined based on the reading result report from the hybrid processing apparatus 10, and imaging the driver license LC is required if the magnetic stripe was not correctly read.

If condition (B), operator instruction, is selected, whether the operator pressed a specific key on the POS terminal computer 60 keyboard 62 is determined, and imaging the driver license LC is required if the specific key was pressed. If condition (B), operator instruction, is selected, the operator determines whether imaging the driver license LC is required based on the type of credit card CC, customer (credit card user) behavior, or other indications of potentially illegal use, and presses the specific key is imaging is determined necessary.

If condition (C), transaction amount, is selected, whether the amount to be charged to the credit card CC exceeds a specific limit is determined, and imaging the driver license LC is required if the transaction amount exceeds this limit.

If condition (D), credit card transaction history, is selected, the credit card proof-of-transaction records stored in the database 71 of the POS server 70 are searched to determine from the past history of credit card use by the customer (credit card user) if the credit card CC has not been used for a specific period of time (referred to below as the "no-transaction period"). Imaging the driver license LC is required if this no-transaction period exceeds a specific time limit. When condition (D), credit card transaction history, is applied, the past transaction history is retrieved from the credit card proof-of-transaction records in the database 71 when a credit card CC payment is selected. The date of the last credit card CC transaction is then extracted from the transaction history, and the no-transaction period is calculated based on the last transaction date and the current date.

Note that if condition (C), transaction amount, or condition (D), credit card transaction history, is selected as the first condition (condition 1) in this embodiment, a second evaluation criterion (condition 2) must also be selected.

If condition (E), transaction amount and historical credit card transaction amounts, is selected, the transaction history (credit card proof-of-transaction records) stored in the database 71 of the POS server 70 is referenced to determine from the history of past credit card use by that customer (credit card user) if the historically highest transaction amount charged to that credit card CC is less than or equal to the current transaction amount of the credit card CC. Imaging the driver license LC is required if the current transaction amount is greater than the previous highest charge. If condition (E) is selected but there is no previous history of credit card use, the historically highest transaction amount is assumed to be zero, and a driver license LC is therefore always required the first time a customer uses a credit card CC in a store (or plurality of stores using a common POS system 1).

The evaluation criteria (condition 2) set (in step S12) when either condition (C), transaction amount, or condition (D), credit card transaction history, is selected are described next.

If condition (C), transaction amount, is set, the threshold transaction amount must be set. In this implementation of the invention this threshold amount can be set from the keyboard 62 or selected from among plural threshold value ranges. Note that credit card processing is faster if this threshold amount is high, but a high threshold amount also increases the risk of credit card fraud. This threshold amount must therefore be set with consideration for both store risk and job efficiency.

If condition (D), credit card transaction history, is set, the no-transaction period must be defined. The no-transaction period is set in this embodiment by selecting the time unit (years, months, days) and entering a numeric value from the keyboard 62. The no-transaction period could also be selected from a plurality of preset options. If the no-transaction period is set to 0 (years, months, days), absence of a past credit card transaction history is used as the condition for requiring driver license LC imaging. As a result, a driver license LC is always required the first time a customer uses a credit card CC in a store (or plurality of stores using a common POS system 1) if the no-transaction period is set to 0 (years, months, days).

The credit card transaction process run by the POS terminal computer 60 and hybrid processing apparatus 10 is described next below with reference to the flow chart in FIG. 8. Condition (A), reading result, is assumed to be the evaluation criterion selected in step S11 in FIG. 7.

As shown in FIG. 8, the POS terminal computer 60 starts the transaction process by setting a transaction number uniquely identifying each transaction process (S21). The operator then enters the product information for the products purchased by the customer using the barcode reader 65, for example, and when all product information has been entered determines the payment (transaction) method desired by the customer. A hybrid processing apparatus 10 according to this embodiment of the invention can process both credit card CC and check S transactions, and the user can therefore choose to pay by cash, credit card CC, or check S.

The operator enters the payment method selected by the customer to the POS terminal computer 60, and the POS terminal computer 60 sets the transaction method based on the operator input (S22). Note that if a credit card CC or check S is inserted to the hybrid processing apparatus 10, payment method entry by the operator could be omitted. If the payment method is not by credit card CC (S22 returns no), the transaction is processed using the selected method (S23). Further description of said methods is omitted below.

If the payment method is set to a credit card CC (S22 returns yes), the hybrid processing apparatus 10 is instructed to read the magnetic stripe (S24). This instruction is presented to the operator by displaying an appropriate message on the operator display 63a, such as "please insert credit card." A corresponding message, such as "please present your credit card," is also preferably displayed on the customer display 63b.

When the hybrid processing apparatus 10 receives a magnetic stripe read command from the POS terminal computer 60, the hybrid processing apparatus 10 reads the magnetic stripe information by means of the magnetic head 58 (S25) and sends the read magnetic stripe information as the read result to the POS terminal computer 60 (S26). If the magnetic stripe could not be read normally because of a scratch through the magnetic stripe, for example, the read report sent by the hybrid processing apparatus 10 indicates that the magnetic stripe is unreadable (S26).

When the POS terminal computer 60 receives the read result form the hybrid processing apparatus 10 (S27), the POS terminal computer 60 determines if the magnetic stripe was readable or not based on the read result (S28). If the stripe is determined not normally readable (an "unreadable" report is returned, (S28 returns no), the POS terminal computer 60 instructs the hybrid processing apparatus 10 to image both the credit card CC and driver license LC (S29). The credit card imaging instruction is issued in order to extract the credit card information, and the driver license LC imaging command is issued because the possibility of credit card fraud is often higher when the magnetic stripe information cannot be read normally. As a result, the credit card information and driver license information can be saved for use as criminal evidence if the credit card is used illegally.

When a credit card CC and driver license LC imaging command is sent to the hybrid processing apparatus 10, a prompt such as "please insert driver license" is presented on the operator display 63a. A message such as "please show your driver license" is also preferably presented on the customer display 63b.

When the hybrid processing apparatus 10 receives a credit card CC and driver license LC imaging command from the POS terminal computer 60, the credit card CC is imaged first by the scanner head 44 (S30). The operator does not need to insert the credit card at this time because the credit card CC is already in the card transportation path 41. After the credit card CC is imaged by the scanner head 44, the credit card CC is discharged from the card insertion opening 41a.

When the operator then inserts the driver license LC, the scanner head 44 images the driver license LC (S31). The captured credit card CC and driver license LC image data is then OCR processed by the OCR 151 (S32) to extract the card information and driver license information as the OCR result, and this information is sent to the POS terminal computer 60 (S33). If the OCR process cannot be normally completed, an OCR failure is sent as the OCR result to the POS terminal computer 60. Note that the OCR processes shown in step S32 could be executed in separate steps after the credit card CC is imaged and then after the driver license LC is imaged.

If the POS terminal computer 60 determines that imaging (or OCR processing) either the credit card CC or driver license LC was unsuccessful after receiving the OCR result from the hybrid processing apparatus 10 (S34 returns no), the POS terminal computer 60 stops the transaction (S35). Although not particularly shown in the figures, the operator can also stop the transaction by pressing a particular key on the keyboard 62 without waiting for the OCR result from the hybrid processing apparatus 10 if the customer does not present a driver license LC, for example.

If the credit card CC and driver license LC are normally imaged and OCR processed, and the card information and driver license information is acquired (S34 returns yes), a credit card check is run based on the detected card information (S36).

Furthermore, if the POS terminal computer 60 determines that the magnetic stripe information was read correctly (when the magnetic stripe information is sent from the hybrid processing apparatus 10, S28 returns yes), the credit card check is run using the magnetic stripe information. If the credit card transaction is approved (S37 returns yes), the credit card CC purchase is approved (S38), and print data indicating the transaction content and credit card CC charge information is sent to the hybrid processing apparatus 10 (a print command is output) (S39). If the credit card check indicates that a lost or stolen card report was filed or there is the possibility of a credit card forgery (S37 returns no), the transaction is stopped (S35).

Based on a print command from the POS terminal computer 60, the hybrid processing apparatus 10 then prints a receipt R, and issues a receipt and credit card charge slip (S40). After approving the credit card CC transaction (S38), the POS terminal computer 60 generates a credit card proof-of-transaction record (S41), and sends the credit card proof-of-transaction record to the POS server 70 (S42). Note that if step S28 returns yes, the transaction number, magnetic stripe information, and transaction content are sent as the credit card proof-of-transaction record. If S28 returns no and S34 returns yes, the transaction number, card information, transaction content, and driver license information are reported as the credit card proof-of-transaction data. The POS server 70 then saves the credit card proof-of-transaction record to the database 71 so that the data can be later read and searched when a command is received from the POS terminal computer 60.

The POS terminal computer 60 could also instruct the hybrid processing apparatus 10 to scan and image the credit card CC and driver license LC after magnetic stripe reading fails twice. More specifically, if the hybrid processing apparatus 10 reports that the magnetic stripe was unreadable, the POS terminal computer 60 tells the hybrid processing apparatus 10 to read the magnetic stripe again. If the hybrid processing apparatus 10 reports that the second attempt to read the magnetic stripe also failed, the POS terminal computer 60 then instructs the hybrid processing apparatus 10 to image the credit card CC and driver license LC. Because reading the magnetic stripe often fails on the first attempt but succeeds on the second attempt, this arrangement waits for reading to fail twice consecutively before starting the OCR process rather than extracting the card number by OCR processing the first time reading the magnetic stripe fails. This greatly reduces the frequency of OCR processing, and thus improves job efficiency.

The captured image data could also be stored as the credit card proof-of-transaction data instead of the OCR results when the credit card CC or driver license LC is imaged.

Thus storing the raw, unprocessed image data provides even more reliable criminal evidence if the credit card is used fraudulently.

Condition (A), reading result, is used for determining whether to image a driver license LC in the above example, but it will be noted that other than using different evaluation criteria, the process is the same as described above when a different condition is selected. However, if condition (B), operator instruction, is selected, the operator must indicate that scanning is required (by pressing a specific key) between when the payment method is selected (S22) and when the magnetic stripe read command is issued (S24). Alternatively, the driver license LC could be imaged if the operator command is received any time before the transaction process is completed. An imaging command could also be asserted by specific actions other than pressing a specific key, such as inserting a driver license LC to the card insertion opening 41 a. Imaging could also be executed unless the operator performs a specific action.

When condition (C), transaction amount, is selected, the transaction amount is determined by the entered product information. As a result, whether to image the driver license LC is determined when the payment method is selected (S22). Commands for reading the magnetic stripe from the credit card CC and imaging the driver license LC can therefore be issued at the same time in this case. Whether the driver license LC must be imaged shall also not be limited to whether the current transaction amount is greater than the previous highest transaction amount. More specifically, image scanning can be determined based on comparing the current transaction amount with the average of all past transaction amounts, or whether the current transaction amount exceeds the previous highest transaction amount by a specified multiple or other factor.

Furthermore, if condition (D), credit card transaction history, or condition (E), transaction amount and historical credit card transaction amounts, is selected, time is required to query the database 71 on the POS server 70 and search the transaction history (credit card proof-of-transaction data). The credit card CC transaction process therefore preferably proceeds while querying the database 71 and searching the data at the same time. In other words, if the magnetic stripe information was not successfully read, a credit card CC imaging command is output in step S29, and the hybrid processing apparatus 10 runs the OCR process and credit card. A command to scan and image the driver license LC is then output as required based on the result returned from the POS server 70.

The data query and output process run by the POS terminal computer 60, POS server 70, and hybrid processing apparatus 10 is described next with reference to the flow chart in FIG. 9. This process runs when a credit card CC is used illegally or when there is an inquiry from a customer, and is different from the data query used to determine whether the evaluation conditions are met when using either condition (D), credit card transaction history, or condition (E), transaction amount and historical credit card transaction amounts, as described above.

As shown in FIG. 9, when the POS terminal computer 60 inputs the transaction number, credit card number, cardholder name, or driver license number (note that the driver license number is enterable for queries relating to transportation processes in which the driver license LC is imaged) and sends a credit card proof-of-transaction data query to the POS server 70 (S51), the POS server 70 searches credit card proof-of-transaction records previously stored in the database 71 for the desired data (S52).

If a credit card proof-of-transaction record containing a keyword matching any of the transaction number, credit card number, name, or driver license number keywords in the query sent from the POS terminal computer 60 is found, the matching record is returned to the POS terminal computer 60 (S53) as the query result. If more than one record containing a matching keyword (credit card number, name, or driver license number) is found, the plural credit card proof-of-transaction records are sorted by transaction number and returned to the POS terminal computer 60 as the query result.

The POS terminal computer 60 then presents the query result on the operator display 63a (S54), and issues a query result (credit card proof-of-transaction record) print command to the hybrid processing apparatus 10 if necessary (S55). Based on the print command from the POS terminal computer 60, the hybrid processing apparatus 10 then prints the query result to a receipt R (S56). The credit card proof-of-transaction data (the transaction number, magnetic stripe information or card information, transaction process content, and driver license information (the driver license information is printed only when the driver license LC is scanned)) is printed as the query result to the receipt R at this time.

The data printed to the receipt R could also be limited to only specific data selected at the POS terminal computer 60 from among the multiple data fields contained in the credit card proof-of-transaction record. Printing could, for example, be limited to only the magnetic stripe information and transaction content.

Furthermore, if multiple credit card proof-of-transaction records are presented on the operator display 63a as the query result, printing can be limited to only the credit card proof-of-transaction record selected by the operator.

Yet further preferably, when the desired credit card proof-of-transaction record cannot be identified by a keyword search alone, a date or a date range (such as year XXXX or from month first_month to month last_month) could be specified, or the query could be limited to certain purchased products (product data contained in the receipt print data).

A credit card processing control method, program, credit card processing apparatus, POS terminal, and POS system according to the present invention can thus scan and image a driver license LC presented by a credit card user to create a transaction record containing information that can be used as criminal evidence in the event a credit card is used illegally (such as when a credit card is forged). Furthermore, because a driver license LC is scanned only when the transaction process meets specific conditions and not for all credit card users, these records of potential criminal evidence can be efficiently created without lowering job efficiency.

Furthermore, using condition (A), reading result, creates this criminal evidence record when the magnetic stripe cannot be read normally, that is, when the risk of credit card forgery is high. The credit card CC image data is OCR processed and a credit card check is run based on the OCR result when the card information cannot be extracted from the magnetic stripe information in the foregoing embodiment.

Alternatively, however, an impression of the credit card could be taken using a manual imprinter (a machine for manually reading the card information by manually copying the embossed characters), and the credit card check could be run using the card information read from the impression.

Further alternatively, the face of the credit card (the side with the raised characters) could be copied on a photocopier and the copy faxed to the credit card company for authorization.

Using the present invention to save information from a driver license LC can more effectively prevent illegal credit card use even when necessary to rely on such a low security credit card check.

Furthermore, using condition (B), operator instruction, creates this criminal evidence record based on whether the operator issues an image scanning command. The potential for credit card forgery is considered particularly high with corporate credit cards. As a result, the operator could visually inspect each credit card and issue the image scanning command to image the customer's driver license LC when a corporate credit card is presented. The operator could also consider other factors such as local conditions or customer behavior, for example, and issue the image scanning command when the operator determines that the risk of credit card fraud is high, thereby efficiently preventing illegal credit card use.

If corporate credit cards are assigned a specific number and can thus be automatically identified, image scanning the driver license LC could be triggered automatically when a corporate credit card is identified.

Furthermore, using condition (C), transaction amount, creates this criminal evidence record when the transaction amount exceeds a specified threshold value, that is, when the risk of illegal credit card use is high. Store risk can thus be effectively reduced, and illegal use can be efficiently prevented.

Furthermore, using condition (D), credit card transaction history, creates this criminal evidence record based on whether there is a history of past credit card use or based on how long the credit card has not been used (that is, the no-transaction period). When image scanning is based on past credit card use, a driver license LC is always required the first time a credit card CC is used, and criminals fearing identification will refrain from illegally using a credit card CC. Illegal use is thus prevented before the credit card is used. Because driver licenses LC must be renewed, scanning the driver license LC when the credit card has not been used for a certain period of time produces a more reliable record of criminal evidence.

Furthermore, using condition (E), transaction amount and historical credit card transaction amounts, creates this criminal evidence record when the amount of the current transaction is greater than the previous highest transaction amount. When a credit card that is normally used only for small purchases, such as buying household goods and food in the grocery store or department store, is presented to pay for expensive purchases of jewelry or large appliances, for example, that is, when the likelihood of credit card theft and illegal use is high, a record of criminal evidence can be created by thus requiring and scanning a driver license LC.

Furthermore, storing information relating to each transaction process as a credit card proof-of-transaction record in a database that is searchable using any data stored in any credit card proof-of-transaction record enables rapidly finding and retrieving the desired data when illegal credit card use is discovered or a customer inquiry is received. The required storage capacity is also reduced by storing the OCR results rather than storing the raw image data captured from the credit cards CC or driver licenses LC.

Proof of a transaction can also be quickly provided when a customer inquiry is received because the credit card proof-of-transaction record returned as the query result can be printed. A specific printer for printing the query results is also not needed because the credit card proof-of-transaction record can be printed using the receipt printer.

The operator can also easily determine when image scanning the driver license LC (that is, asking the customer for her driver license) is necessary because an appropriate prompt is displayed on the operator display 63a when image scanning the driver license LC is necessary.

The POS terminal computer 60 determines whether to image a driver license LC based on the magnetic stripe information read by the hybrid processing apparatus 10 in the foregoing embodiment as shown in FIG. 8, but the hybrid processing apparatus 10 could run this process. In this case the hybrid processing apparatus 10 reads the magnetic stripe information, determines if the magnetic stripe was read correctly, and proceeds with imaging the credit card CC and OCR processing if the magnetic stripe was not read correctly. The operator is also prompted by an LED or other display means to insert the driver license LC when the magnetic stripe information is not read correctly, and images and OCR processes the inserted driver license LC. A credit card proof-of-transaction record is then generated by linking the read information with the transaction number and transaction process content extracted from the print data sent from the POS terminal computer 60, and sent through the POS terminal computer 60 to the POS server 70. Executing this process on the hybrid processing apparatus 10 thus reduces the processing load on the POS terminal computer 60 when, for example, processing on the POS terminal computer 60 is complicated by entering additional product information or correcting product information after the payment method has been set on the POS terminal computer 60. This arrangement also enables implementing the present invention without greatly modifying the POS application used on the POS terminal computer 60.

The hybrid processing apparatus 10 also applies the OCR process to the image data captured from credit cards CC or driver licenses LC in the foregoing embodiment, but the POS terminal computer 60 could run the OCR process. The OCR process can thus be run more quickly by using the high performance processor (CPU) of the POS terminal computer 60.

The transaction number, magnetic stripe information or card information, transaction content, and driver license information (when the driver license LC is imaged) is saved to a credit card proof-of-transaction record in the embodiment described above. The invention shall not be so limited, however, and what data is stored can be determined according to the database 71 capacity and the needs of each store or business. For example, the credit card proof-of-transaction record could contain only the transaction number and driver license information.

The credit card proof-of-transaction data could be stored in an internal or external data storage device (recording medium) rather than in the POS server 70. Furthermore, when the hybrid processing apparatus 10 generates the credit card proof-of-transaction data, the credit card proof-of-transaction data could be stored in a storage device (recording medium) connected internally or externally to the hybrid processing apparatus 10.

The card information acquired from a credit card CC as the OCR result includes the credit card number, cardholder name, and expiration date in the foregoing embodiment, but the card information could contain only the credit card number.

In addition, the driver license information acquired as the OCR result from a driver license LC includes the driver license number and driver name in the foregoing embodiment, but the driver license information could contain only the driver license number.

A driver license LC is required as the proof of identification stored in a credit card proof-of-transaction record in the foregoing embodiment, but the invention shall not be so limited. More specifically, other types of personal identification, including passports, insurance cards, and other types of personal ID cards, can be used instead of a driver license. The personal identification preferably includes a photograph of the person. Requiring a photo ID enables the operator to easily visually verify a person's identity, and thus prevents the use of lost or stolen personal identification.

Yet further preferably, image data scanned from personal identification is also stored with the credit card proof-of-transaction data, past credit card proof-of-transaction data is extracted by searching the database 71 when a credit card CC is used, and the retrieved credit card proof-of-transaction data (particularly the image of the personal identification) is presented on the operator display 63*a*. When the credit card CC has been used in the past, this arrangement enables the operator to visually compare the past credit card proof-of-transaction data (personal ID image) with the personal ID presented by the current customer, and determine that the risk of fraudulent use is high if the presented ID card does not match the stored image data. Furthermore, if the personal ID is a photo ID, the operator can compare the customer's face with the stored image data to verify the person's identify.

One of conditions (A) to (E) is selected in the foregoing embodiment as the condition for determining whether image scanning the driver license LC is necessary. Two or more of these conditions (A) to (E) could be selected for use together with imaging required only when both conditions are met (that is, a logical AND is applied). Alternatively, two or more of these conditions (A) to (E) could be selected for use together with imaging required when either condition is met (that is, a logical OR is applied).

Furthermore, instead of the POS terminal computer 60 setting the evaluation conditions as in the foregoing embodiment, the POS server 70 could send a condition selection command to the POS terminal computer 60 specifying which condition(s) to use. These conditions could be stored in flash memory in the POS terminal computer 60, for example, and retrieved in response to this condition selection command.

When the decision whether to scan the driver license LC is made on the hybrid processing apparatus 10, the evaluation conditions could be selected on the setup screen (presented on the operator display 63*a*) that is called by the driver (such as the printer driver) for configuring hybrid processing apparatus 10 functions.

The functions (means) of the hybrid processing apparatus 10 or POS terminal computer 60 described above can also be provided by a computer-executable program.

The credit card processing control method of the present invention can also be implemented on a system other than the POS system 1 shown in the foregoing embodiment of the invention by storing this program to a computer-readable storage medium (not shown in the figure) and installing said program to a personal computer.

The storage medium could be a CD-ROM disc, flash ROM, memory card (such as Compact Flash (R), Smart media, or memory stick), Compact Disc, magneto-optical disc, DVD, or floppy disk, for example.

The functions of the hybrid processing apparatus 10 and the POS terminal computer 60 could also be incorporated in a single stand-alone credit card processing apparatus. By thus providing all functions in a single unit, less installation space is required, and delivery and setup, including connection, is simple.

The check processing functions and receipt printing functions could also be omitted from the hybrid processing apparatus 10.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A method for processing credit card transactions associated with sales conducted through a terminal computer or register in a POS system having an image scanner comprising the steps of:

calculating a credit card transaction amount based on product information entered by an operator into the terminal computer of the POS system;

setting a predetermined reference amount corresponding to a desired charge limit in relation to each credit card user;

comparing the calculated credit card transaction amount by a given credit card user to the predetermined reference amount established for the same credit card user;

determining if the transaction amount is equal to or exceeds the predetermined reference amount for the same credit card user; and using the image scanner to image personal identification provided by the credit card user if the determination indicates that the transaction amount equals or exceeds the predetermined reference amount.

2. A method as defined in claim 1 in which the credit card has a magnetic stripe containing information in relation to the credit card user further comprising the steps of:

extracting information from the magnetic stripe on the credit card;

comparing the extracted information to stored historical information including past transaction processes and to stored historical information about the credit card user;

requiring the credit card user to present personal identification other than the credit card when such comparison satisfies certain criteria based on the presence or absence of the historical transaction information for the credit card; and using the image scanner to image the personal identification when required.

3. The method as described in claim 2, further comprising:

comparing the transaction amount to historical transaction information stored in the database for such credit card user;

determining if the current transaction amount for the credit card user is greater than the previous highest transaction amount stored in the data base for the same credit card user; and using the image scanner to image personal identification of the credit card user if the determination exceeds a predetermined amount established as a reference.

4. The method as described in claim 3, wherein the stored transaction history includes credit card proof-of-transaction data, and at least the transaction number of the transaction process and wherein the credit card number is extracted from the magnetic stripe information on the card for each transaction process in addition to the user-related information; and wherein said comparison includes comparing the credit card proof-of-transaction data containing transaction numbers, user names, and card numbers for a specific transaction number, user name, or credit card number when identified.

5. The method as described in claim 4, further comprising:

extracting personal identification information from the personal identification provided by the credit card user including the identification number recorded on the personal identification by OCR processing an image of the personal identification; and storing the personal identification of the credit card user when imaged; in the transaction history data base with the credit card proof-of-transaction data and comparing the credit card data to stored credit card proof-of-transaction data containing transaction numbers, user names, card numbers, and identification numbers when a specific transaction number, user name, credit card number, or identification number is specified.

6. The method as described in claim 4, further comprising:

printing credit card proof-of-transaction data found in the comparison step using a printer for printing the transaction process result on a receipt.

7. The method as described in claim 1, further comprising:

reporting the result of the image scanning determination step.

8. Apparatus for processing credit card transactions associated with POS sales, comprising:

a transaction amount calculator for calculating a credit card transaction amount based on product sales using the credit card;

a reference calculator for setting a predetermined reference amount corresponding to a desired charge limit in relation to each credit card user;

a comparator for comparing the transaction amount for the credit card transaction by a given credit card user to the predetermined reference amount established for the same credit card user;

a transaction amount evaluator for determining if the transaction amount is equal to or exceeds the predetermined reference amount;

an image scanning determinator for evaluating whether to image personal identification of the credit card user based on the determination result of the transaction amount evaluator; and an image scanner for imaging the personal identification when the determinator deems image scanning of personal identification to be necessary.

9. Apparatus for processing credit card transactions associated with POS sales comprising:

a transaction history storage data base for storing historical information about past transaction processes, of credit card users including information about the credit card user extracted from magnetic stripe information;

an image scanning determinator for determining whether to image personal identification of the credit card user other than the credit card based on presence or absence of historical transaction information for the credit card user; and an image scanner for imaging the personal identification when image scanning the personal identification is determined to be necessary.

10. Apparatus as described in claim 9, wherein the image scanning determinator determines whether to image scan the personal identification based on the presence or absence of an image scanning command from the operator.

* * * * *